United States Patent [19]

Terada et al.

[11] Patent Number: 5,445,025
[45] Date of Patent: Aug. 29, 1995

[54] ANGULAR VELOCITY SENSOR HAVING A BALANCED TUNING FORK STRUCTURE AND THE METHOD OF MANUFACTURE

[75] Inventors: Jiro Terada, Hirakata; Hiroshi Takenaka, Ikoma; Masaharu Ushihara, Hirakata; Masami Tamura, Uji; Hitoshi Nishimura; Kikuo Kaino, both of Hirakata, all of Japan

[73] Assignee: Matsushita Electric Industrial Co., Ltd., Osaka, Japan

[21] Appl. No.: 92,354

[22] Filed: Jul. 15, 1993

[30] Foreign Application Priority Data

Feb. 3, 1993 [JP] Japan .................. 5-016054
Feb. 3, 1993 [JP] Japan .................. 5-016122

[51] Int. Cl.⁶ .............................................. G01P 9/04
[52] U.S. Cl. ..................... 73/504.15; 310/321; 73/504.16
[58] Field of Search ............. 73/505, 570, 493, 1 D; 310/321, 329, 370

[56] References Cited

U.S. PATENT DOCUMENTS

| | | | |
|---|---|---|---|
| 3,683,213 | 8/1972 | Staudte | 310/9.6 |
| 4,320,320 | 3/1982 | Momosaki et al. | 310/361 |
| 4,628,735 | 12/1986 | Kirkpatrick | 73/517 AV |
| 4,899,587 | 2/1990 | Staudte | 73/505 |
| 4,930,351 | 6/1990 | Macy et al. | 73/505 |
| 5,045,745 | 9/1991 | Umemoto et al. | 310/329 |
| 5,212,985 | 5/1993 | Takenaka et al. | 73/505 |

FOREIGN PATENT DOCUMENTS

| | | |
|---|---|---|
| 0085599 | 8/1983 | European Pat. Off. . |
| 3926504 | 2/1990 | Germany . |
| 53-93792 | 8/1978 | Japan . |
| 57-062612 | 4/1982 | Japan . |
| 57-103378 | 6/1982 | Japan . |
| 57-170897 | 10/1982 | Japan . |
| 58-063212 | 4/1983 | Japan . |
| 60-049215 | 3/1985 | Japan . |
| 60-67815 | 4/1985 | Japan ............... 73/505 |
| 61-181913 | 8/1986 | Japan ............... 73/505 |
| 62-15410 | 1/1987 | Japan ............... 73/505 |
| 62-250309 | 10/1987 | Japan ............... 73/505 |
| 3084412 | 4/1991 | Japan . |
| 5034161 | 2/1993 | Japan . |

*Primary Examiner*—Hezron E. Williams
*Assistant Examiner*—Helen C. Kwok
*Attorney, Agent, or Firm*—Ratner & Prestia

[57] ABSTRACT

An angular velocity sensor having a tuning-fork structure comprising a first vibrator including a first actuator and a first detector each attached to a metal plate and joined orthogonally to each other, and a second vibrator including a second actuator and a second detector each attached to another metal plate and joined orthogonally to each other, the two vibrators being coupled by an electrode block to each other in a generally parallel relationship along the axis of detection of the sensor. The first and second detectors have a rectangular plate shape each holding a piezoelectric element. The rectangular plate shape has a lengthwise edge and a widthwise edge where the lengthwise edge parallel to the axis of detection of the sensor and is longer than the width wise edge. At least one of the lengthwise edges of the detectors has a beveled surface formed by removing metal at an angle from the lengthwise edge of the detector to balance the sensor.

7 Claims, 9 Drawing Sheets

ANGULAR VELOCITY SENSOR HAVING A BALANCED TUNING FORK STRUCTURE AND THE METHOD OF MANUFACTURE

BACKGROUND OF THE INVENTION

The present invention relates to an angular velocity sensor known as a gyroscopic instrument and more particularly, to a high-performance angular velocity sensor having a tuning-fork construction where two vibrator units containing piezoelectric elements are coupled to each other and a method of fabricating the same.

A conventional gyroscopic inertia navigation system includes mechanical rotor gyros for determining the direction of a moving object, e.g. an airplane or ship.

Such a mechanical gyroscopic system is steady in the performance but bulky in the size thus increasing the cost of production and hardly permitting the application to any small-sized pertinent apparatus.

Also, an oscillator-type angular velocity sensor is known for detecting a "Coriolis force" with its detector while it is vibrating but not rotating. Such a sensor commonly employs a piezoelectric or electromagnetic oscillation mechanism.

The detection of an angular velocity in the sensor is implemented by sensing a vibration torque of a frequency equal to that of the mass of a gyro which is not rotating but vibrating at a constant rate. The vibration torque is known as the Coriolis force generated when an angular velocity is involved.

The oscillator-type angular velocity sensor can detect the amplitude of the vibration torque to determine an angular velocity. Particularly, a variety of the oscillator-type angular velocity sensors employing piezoelectric elements have been introduced (for example, as depicted in the Proceeding of Japanese Institute of Aviation and Space, Vol.23, No.257, pp. 339–350).

One of the conventional tuning-fork structure oscillator-type angular velocity sensors will now be described referring to FIGS. 12 to 14. The arrangement of the angular velocity sensor is best illustrated in FIG. 12 which consists mainly of four piezoelectric bimorphous elements serving as an actuator, a monitor, and a first and a second detectors. The actuator 101 is orthogonally coupled by a joiner 105 to the first detector 103 constituting a first vibrator 109 while the monitor 102 is orthogonally coupled by another joiner 106 to the second detector 104 constituting a second vibrator 110. The first 109 and the second vibrators 110 are coupled to each other by a connector 107 which is supported at a point by a support 108, thus constructing a tuning-fork structure.

When the actuator 101 of piezoelectric bimorphous element is loaded with a sine-wave voltage signal, its inverse piezoelectric effect causes the first vibrator 109 to vibrate. Then, the action of the tuning-fork structure results in vibration of the second vibrator 110.

Accordingly, the monitor 102 of piezoelectric bimorphous element generates a charge on its surface through its piezoelectric action. The charge is proportional to the sine-wave voltage signal applied to the actuator 101. Hence, a constant, continuous action of vibration is developed by controlling the sine-wave voltage signal to the actuator 101 so that the charge generated by the monitor 102 remains uniform in the amplitude.

The action of the angular velocity sensor for producing an output corresponding to an angular velocity involved will be explained referring to FIGS. 13 and 14. FIG. 13 is a top view of the angular velocity sensor of FIG. 12. As shown, the turning movement at an angular velocity of $\omega$ produces a Coriolis force on the first detector 103 which vibrates at a speed of v. The Coriolis force is at a right angle to the speed v and its magnitude is $2\,mv\omega$ (where m is the equivalent mass at the distal end of the first detector 103).

As the first detector 103 vibrates at the speed v, the second detector 104 is responsive to vibrate at $-v$ and a Coriolis force on the second detector 104 is $-2\,mv\omega$. The two detectors 103 and 104 are stressed in opposite directions by their respective Coriolis forces thus producing charges on the surface through their piezoelectric actions.

When the speed v of vibration created by fork oscillation is expressed by:

$$v = a \cdot \sin \omega \phi t$$

where a is the amplitude of the vibration and $\omega \phi$ is the period of the vibration, the Coriolis force is:

$$F_C = a \cdot \omega \cdot \sin \omega \phi t$$

While the angular velocity $\omega$ is proportional to the vibration amplitude a, the Coriolis force causes either of the two detectors 103 and 104 to deflect in one direction. Hence, the surface charge Q on the detectors 103 and 104 is expressed by:

$$Q \propto a \cdot \omega \cdot \sin \omega \phi t$$

When the vibration amplitude a is controlled to a constant, $$Q \propto \omega \cdot \sin \omega \phi t$$

As understood, the surface charge Q is found proportional to the angular velocity $\omega$ and can be converted to a direct current signal through synchronous transaction at $\omega \phi t$.

In theory, if the angular velocity sensor is subjected to a translational movement rather than the rotation, its two detectors 103 and 104 produce two charges of the same polarity and their resultant DC signals are offset each other generating no output.

However, the two signals derived from the unwanted charges are not always canceled to zero because of a symmetrical error and a difference in weight between the two, left and right, prongs of the tuning-fork structure of the conventional angular velocity sensor in which a plurality of piezoelectric bimorphous elements are assembled in a relatively complex manner and may not be identical in the quality.

For overcoming the disadvantages, best care is taken to assemble the tuning-fork structure to ensure the symmetry and balance of the fork structure. So far, such efforts are found unsuccessful and fail to cancel both undesired signals. The two unwanted signals cause the sensor to deteriorate the thermal characteristics and become oversensitive to external interruption or vibration.

The piezoelectric element essentially includes two electrodes at both sides regardless of bimorphous or unimorphous type. The electrodes are commonly formed of silver materials printed onto both surfaces of an piezoelectric substance and thus, become rarely identical in weight, size, and quality due to the presence of unavoidable burrs impairing the symmetry of the tuning-fork structure.

SUMMARY OF THE INVENTION

The angular velocity sensor according to the present invention has a tuning-fork structure comprising a first vibrator including a first actuator and a first detector joined orthogonally to each other, and a second vibrator including a second actuator and a second detector joined orthogonally to each other, the two vibrators being coupled by an electrode block to each other in parallel relationship along the axis of detection. The first and second detectors have a cross-sectionally four-sided plate shape accompanied with a piezoelectric element. Also, at least one of the first and second detectors has a beveled surface where a part of a corner edge of the four-sided plate of the detector is removed off.

A method of fabricating the angular velocity sensor comprises a step of grinding at least one of the first and second detectors for balancing between the two, first and second, vibrators to eliminate the generation of unwanted signals derived from a balancing error between the two vibrators. For the purpose, the method also includes a step of detecting and applying the unwanted signals to determine whether one or two of the detectors are trimmed in the grinding process.

The piezoelectric element has two electrodes applied to both surfaces of a piezoelectric substance so that at least one of the two electrodes is disposed not to overlap the outer edge of the piezoelectric substance. Accordingly, the fabrication of the piezoelectric elements will be carried out with readiness and the fork assembly of the two vibrators will be balanced with ease.

Also, the first vibrator is formed by bonding a piezoelectric detector element and a piezoelectric actuator element to two, upper and lower, parts of a metal base plate respectively which serve as the first detector and the first actuator and the second vibrator is formed by bonding a piezoelectric detector element and a piezoelectric actuator element to two, upper and lower, parts of a metal base plate respectively which serve as the second detector and the second actuator.

Furthermore, the metal base plate is shaped by turning its two, upper and lower, parts in opposite directions through 90 degrees along a center line defined by two slits extending from both ends inwardly and crosswisely of said base plate so that the two, upper and lower, parts intersect at a right angle to each other. The grinding process is preferably executed by grinding off a part of one corner edge of the four-sided plate of the detector to form a beveled surface. Also, for controlling the balance of the fork assembly during the fabrication, a plurality of apertures may be provided in a specific region of the four-sided plate of the detector by radiation of a laser beam which contributes to the automatic action of the process.

As the two unwanted signals produced by the first and second detectors are offset by each other, the angular velocity sensor provides improved thermal characteristics and prevents the generation of noise caused by external interruption or vibration. As the vibrators are formed by bonding the piezoelectric element to the metal base plate of a particular shape and the electrodes of the piezoelectric element are arranged in a specific manner, the fabrication of the angular velocity sensor will be effected accurately and readily without creating any burrs and dust of the electrodes.

DETAILED DESCRIPTION OF THE INVENTION

Preferred embodiments of the present invention will be described in the form of an angular velocity sensor and its fabricating method referring to the accompanying drawings.

First Embodiment

Figure 1:
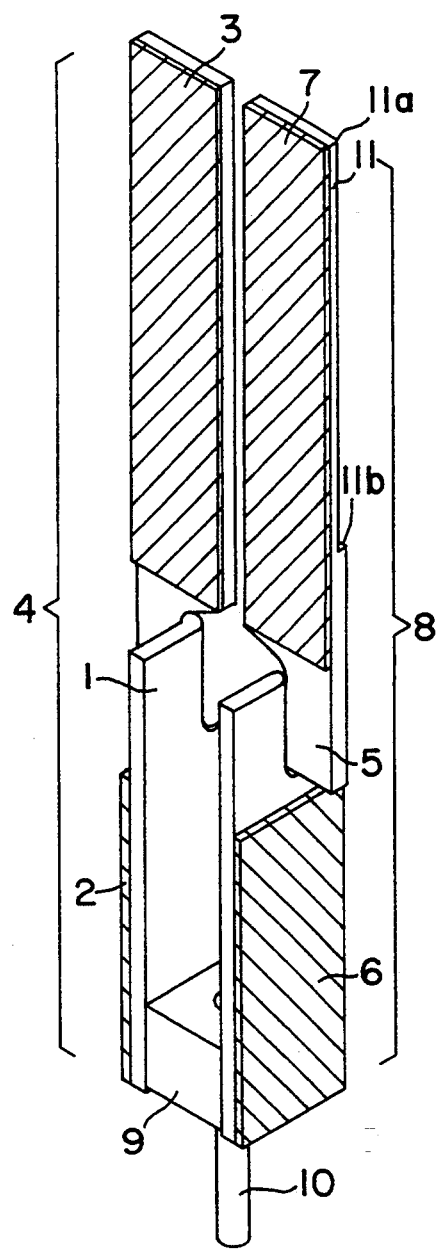
FIG. 1 is a perspective view of an angular velocity sensor fabricated by a method of a first embodiment of the present invention.

FIG. 1 illustrates an angular velocity sensor of the present invention having a tuning-fork structure which comprises a first vibrator 4, a second vibrator 8, an electrode block 9 coupling the first 4 and the second vibrators 8 to each other, and a support pin 10 supporting at one point the electrode block 9. The first vibrator 4 includes a first eternally elastic metal plate 1 formed by turning its two, upper and lower, parts in opposite directions at center to intersect each other at a right angle, and a piezoelectric actuator 2 and a first piezoelectric detector 3 which are bonded to the two parts of the first eternally elastic metal plate 1 respectively.

Similarly, the second vibrator 8 includes a second eternally elastic metal plate 5 formed by turning its two regions parts in opposite directions at center to intersect each other at a right angle, and a piezoelectric monitor 6 and a second piezoelectric detector 7 which are bonded to the two parts of the second eternally elastic metal plate 5 respectively. The eternally elastic metal of this embodiment is elinvar alloy.

The principles of actuation and detection of an angular velocity of the angular velocity sensor of the first embodiment are identical to those of the prior art and will no more be explained. The specific arrangement of the embodiment is such that the upper part of the eternally elastic metal plate 5 of the second vibrator 8 carrying the second piezoelectric detector 7 has at least one beveled surface extending between 11a and 11b where the corner edge is eliminated.

Figure 2:
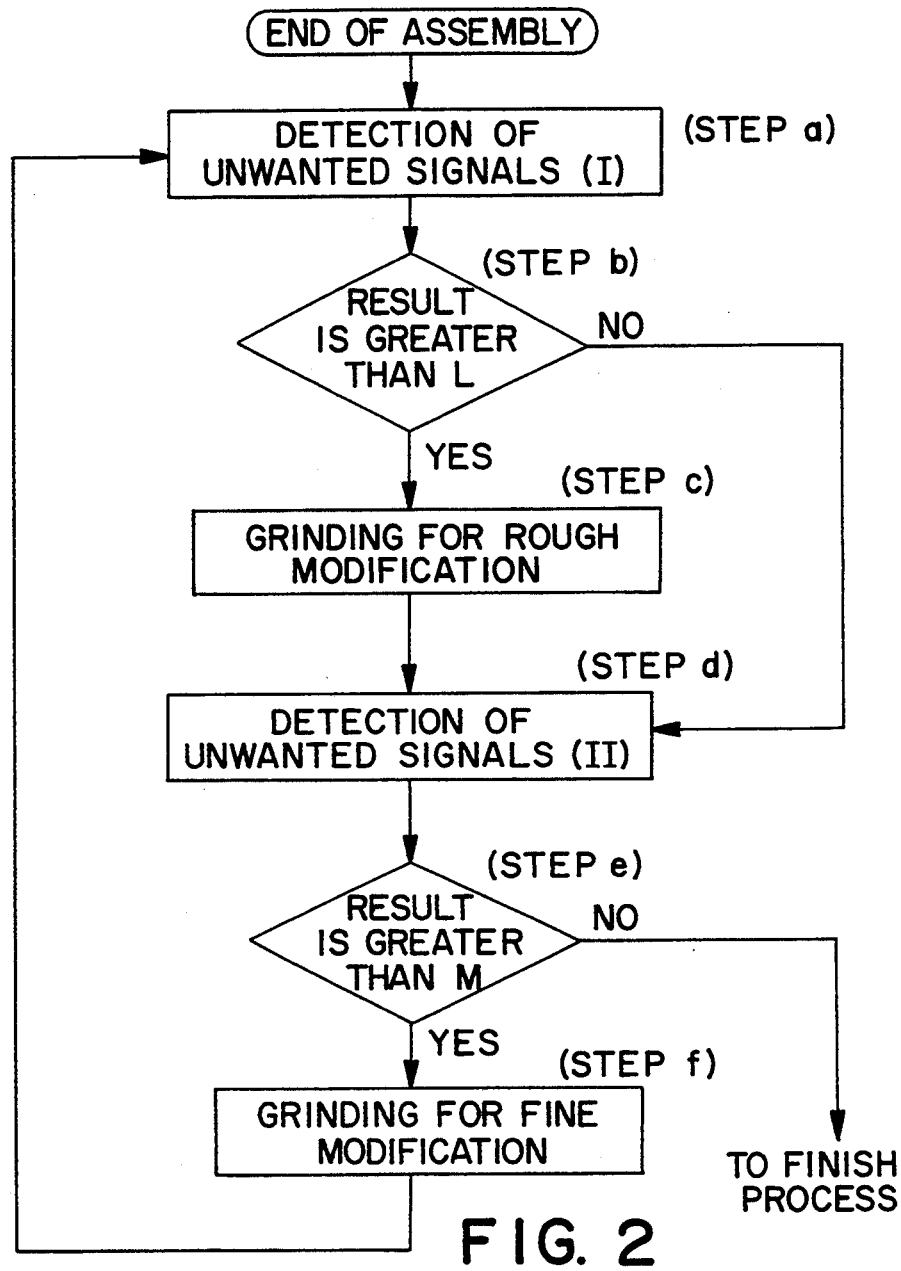
FIG. 2 is a flow chart explaining the fabrication method of the first embodiment.

The method of fabricating the angular velocity sensor will now be described referring to the flow chart of FIG. 2. As depicted previously in the prior art, the first vibrator 4 and the second vibrator 8 assembled in the tuning-fork structure, precisely or not, tend to produce their respective unwanted signals which cannot be offset to zero by each other because of a symmetrical error and a difference in weight between the two vibrators 4 and 8 of which piezoelectric elements are rarely identical in the quality. It is thus provided a trimming process for forming a beveled surface on the upper part or detector component of the vibrator 8 carrying the second piezoelectric detector 7.

The procedure of the method starts with an inspection process (1) for detecting unwanted signals representing the unbalancing factors of symmetrical error in the tuning-fork assembly (Step a). The unwanted signals detected in the inspection process are compared with a reference value L (Step b) and if the signals are smaller than L, the assembly is transferred to the next inspection process (2). If not, it is subjected to the trimming process for rough modification of its detector components. The detector component of the assembly is modified by grinding a part of its corner edge in the trimming process (Step c). Then, unwanted signals on the modified detector elements are detected again (Step d) and compared with a reference value M (M>L) (Step e). If the unwanted signals are smaller than M, the assembly is transferred to a finish process. If not, it is subjected to the trimming process for fine modification of its detector component (Step f). The assembly is returned to the inspection process (1) for reexamining the balance. The assembly accepted at the two inspection processes (1) and (2) only is transferred to the finish process.

The detector component of the first embodiment includes the piezoelectric detector bonded to the eternally elastic metal plate and thus, the trimming on the eternally elastic metal plate will be most effective for balancing the assembly. For example, two of the four corners of the second eternally elastic metal plate 5 are partially removed by grinding in the embodiment. The trimming process is designed for keeping the balance in weight and performance between the two detector components of the tuning-fork assembly so that the two resultant unwanted signals are offset each other.

Figure 3:
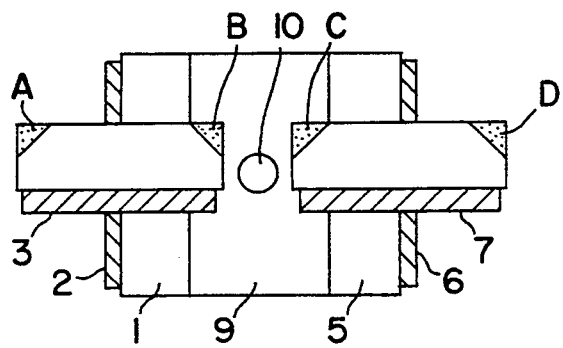
FIG. 3 is a schematic view showing trimming locations in the angular velocity sensor viewed from top.
Figure 4A:
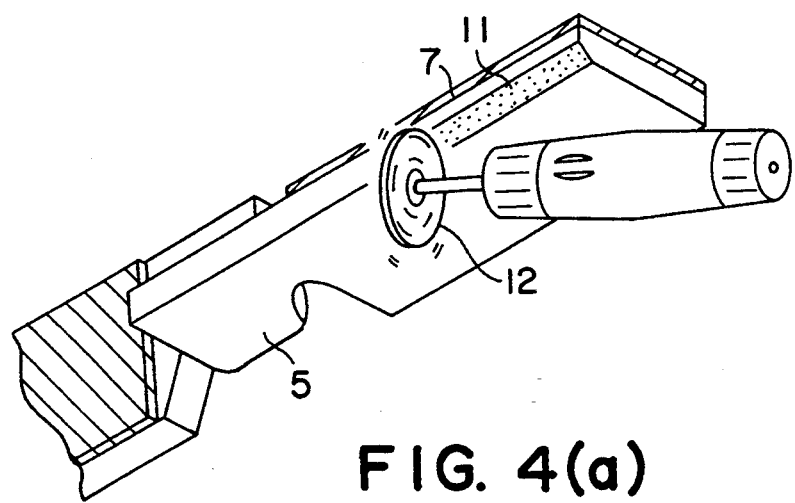
FIG. 4(a) is a perspective view showing an action of the trimming process on the angular velocity sensor of the present invention.
Figure 4B:
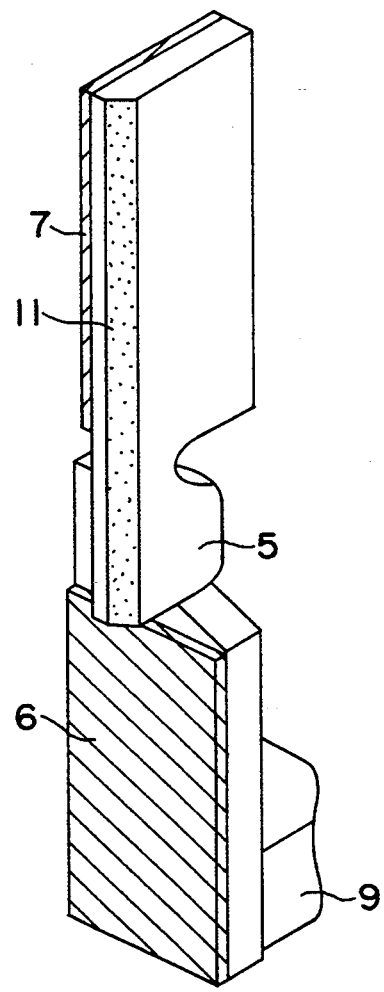
FIG. 4(b) is a perspective view of a part of the angular velocity sensor when the trimming process is completed.

FIG. 3 illustrates trimming locations in the angular velocity sensor viewed from top. As apparent, the four corner edges A, B, C, and D of the two four-sided detector components, each comprising a piezoelectric detector and an eternally elastic metal plate, are removed. The trimming can be carried out with precision by controlling the size and/or location of the removed edges. The two unwanted signals can thus be offset each other by an optimum action of the trimming. FIG. 4(a) shows an action of the trimming process in which a part of the corner edge of the eternally elastic metal plate 7 carrying the piezoelectric detector 7 is being ground with a rotary disk grinder 12 known as a luter to form a beveled surface 11. FIG. 4(b) is a perspective view of a part of the angular velocity sensor in a trimmed state.

Figure 7A:
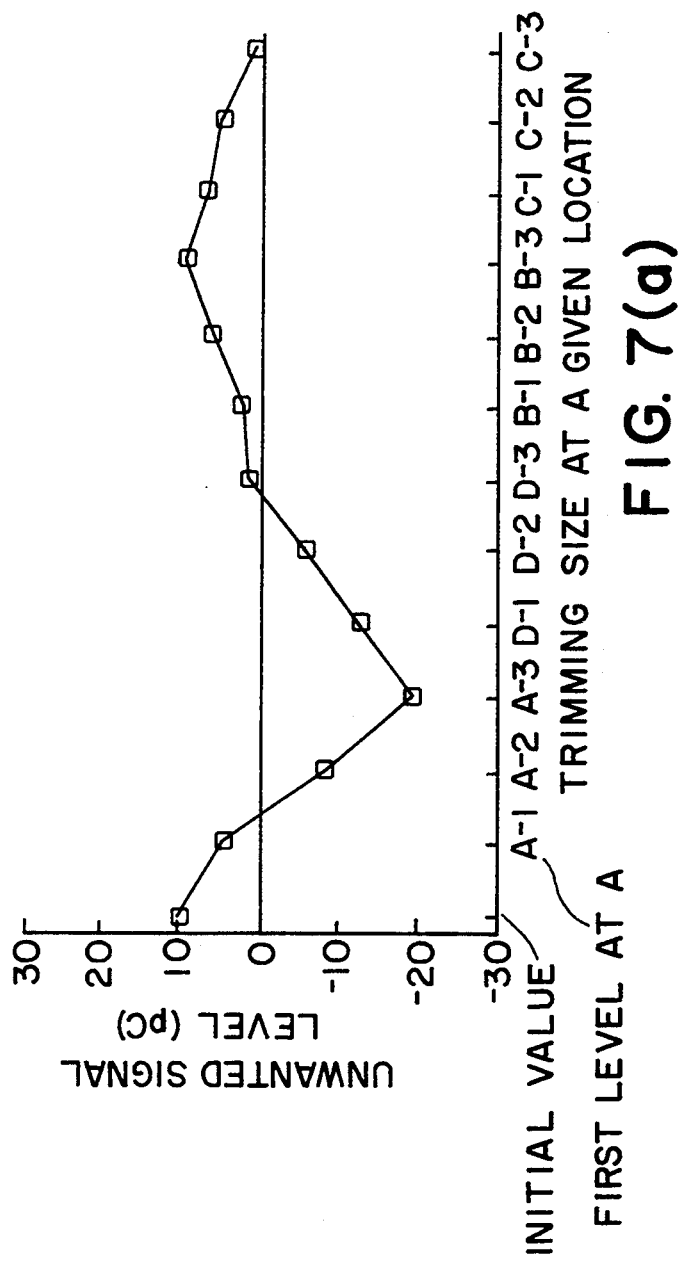
FIG. 7(a) and FIG. 7(b) are a characteristic diagram showing the relation between an unwanted signal level and a trimming size at a given location in the first embodiment of the present invention.
Figure 7B:
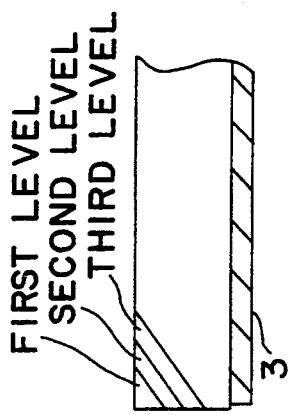

FIG. 7(a) is an experimental data diagram showing the relation between the unwanted signal level and the trimming variations defined by a discrete size of the removed edge at a different location. The size of the removed edge is classified in three levels, assigning the four corner edges A, B, C, and D to A-1, A-2, A-3, B-1, . . . , C-1, C-2, and C-3 respectively. As apparent, the control in a positive direction is effected by trimming of A and C and in a negative direction by trimming of B and D. It is found that the trimming on the outside one of the two corner edges of each detector component results in a steep change in the signal level. Accordingly, it is a good idea for controlling the signal level towards the positive direction to perform the rough modification by removing the corner edge A and then, the fine modification by eliminating the corner edge C. If the control towards the positive direction is overperformed, it may be corrected by trimming on the B or D corner edge.

As set forth above, the angular velocity sensor of the first embodiment of the present invention comprises the first vibrator composed of a first actuator component and a first detector component coupled orthogonally to each other and the second vibrator composed of a second actuator component and a second detector component coupled orthogonally to each other. Also, the two, first and second, vibrators are arranged parallel to each other along the axis of detection to form a tuning-fork structure. In particular, the angular velocity sensor can be controlled in the operating characteristics by grinding off a part(s) of the corner edges of each detector component so that two unwanted signals derived from the symmetrical error are offset to zero. Accordingly, the angular velocity sensor of the first embodiment of the present invention is specifically improved in the thermal characteristics and will avoid the generation of noise caused by external interruption or vibration.

Second Embodiment

Figure 5:
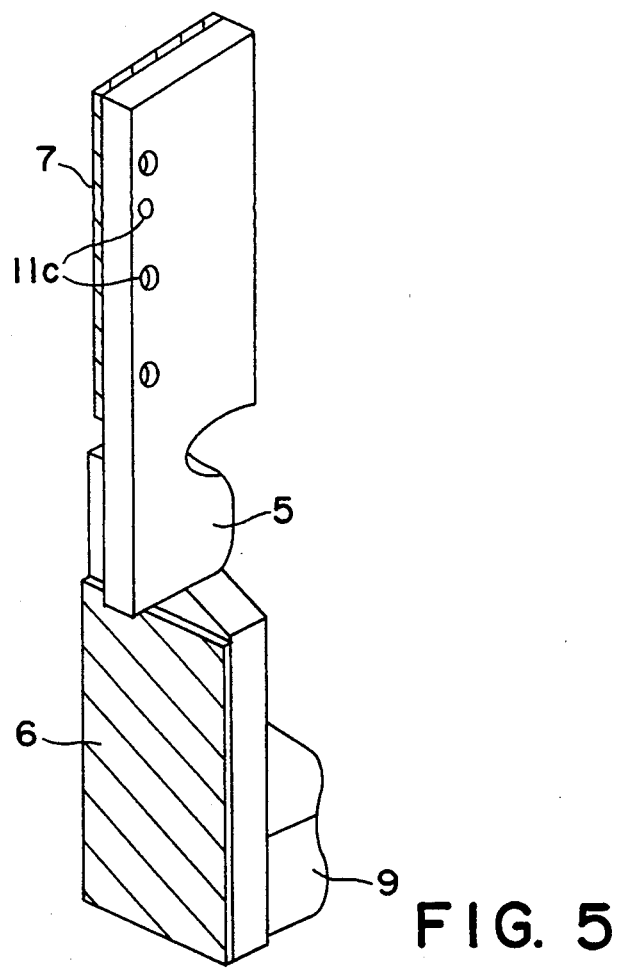
FIG. 5 is a perspective view of a part of an angular velocity sensor fabricated by a method of a second embodiment of the present invention.
Figure 6:
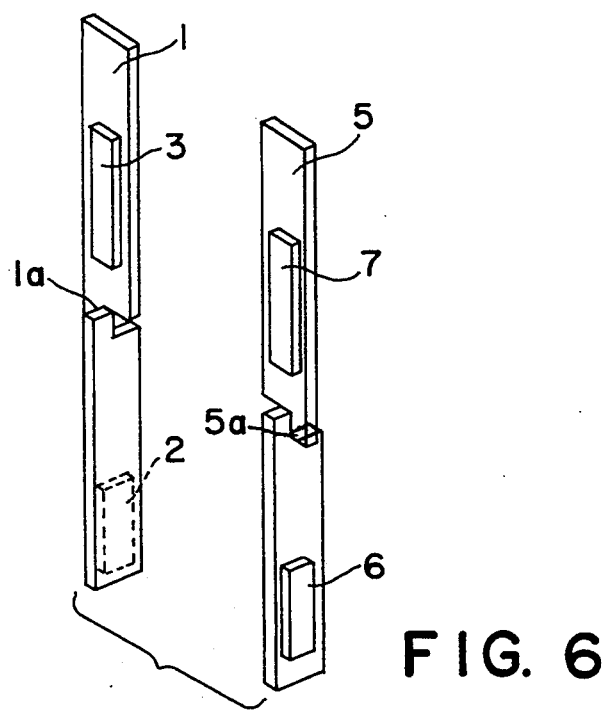
FIG. 6 is a perspective view of two vibrators of the angular velocity sensor explaining the first and second embodiments.

FIG. 5 illustrates an angular velocity sensor of a second embodiment of the present invention which is distinguished from the first embodiment by the fact that the trimming is executed by providing a plurality of apertures 11c in an edge region of the eternally elastic metal plate 5 of the detector component. The apertures 11c are formed with the use of a laser beam and are different in size. More specifically, the action of grinding in the first embodiment is replaced with the forming of apertures with a laser beam for elimination of unwanted signals derived from a balancing error between the two vibrators. The technique of the second embodiment allows the laser beam to be controlled to produce the apertures of desired size and/or depth appropriate to balance the tuning-fork assembly of the vibrators, increasing the efficiency of the trimming process.

In either of the first and second embodiments, each of the first 1 and the second eternally elastic metal plates 5 is formed by turning two, upper and lower, parts of a metal plate through 90 degrees in opposite directions along a center folding line defined by two crosswise slits extending inwardly from opposite ends to the center so that they intersect each other at a right angle. The folding lines 1a and 5a is located at a center of the width and extends longitudinally from the center thus contributing to the symmetry of the two vibrators.

Third Embodiment

A third embodiment of the present invention will be described referring to FIGS. 8 to 11.

Figure 8:
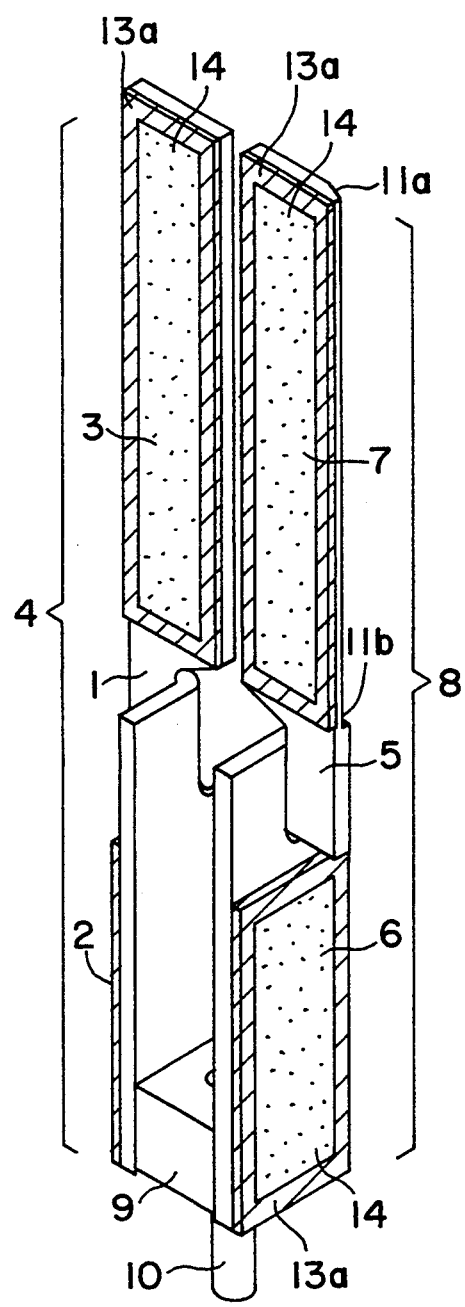
FIG. 8 is a perspective view of an angular velocity sensor fabricated by a method of a third embodiment of the present invention.

FIG. 8 shows an angular velocity sensor of the third embodiment having a tuning-fork structure which comprises a first vibrator 4, a second vibrator 8, an electrode block 9 coupling the first 4 and second vibrators 8 to each other, and a support pin 10 supporting at one point the electrode block 9. The first vibrator 4 includes a first eternally elastic metal plate 1 formed by turning its two, upper and lower, parts in opposite directions to intersect each other at a right angle, and a piezoelectric actuator 2 and a first piezoelectric detector 3 which are bonded to the two parts of the first eternally elastic metal plate 1 respectively. Similarly, the second vibrator 8 includes a second eternally elastic metal plate 5 formed by turning two parts in opposite directions to intersect each other at a right angle, and a piezoelectric monitor 6 and a second piezoelectric detector 7 which are bonded to the two parts of the second eternally elastic metal plate 5 respectively.

Each of the piezoelectric actuator 2, the piezoelectric monitor 6, the first piezoelectric detector 3, and the second piezoelectric detector 7 is formed of a piezoelectric substance 13a sandwiched between two electrodes 14 which are smaller in size than the piezoelectric substance 13a. The upper region of the eternally elastic metal plate 5 carrying the second piezoelectric detector 7 has a beveled surface 11 extending between 11a and 11b where the corner edge is removed.

Accordingly, the principles of actuation and detection of an angular velocity are identical to those of the prior art and will no more be explained.

The method of fabricating the angular velocity sensor of the third embodiment will be described referring to FIGS. 9 to 11.

Figure 9A:
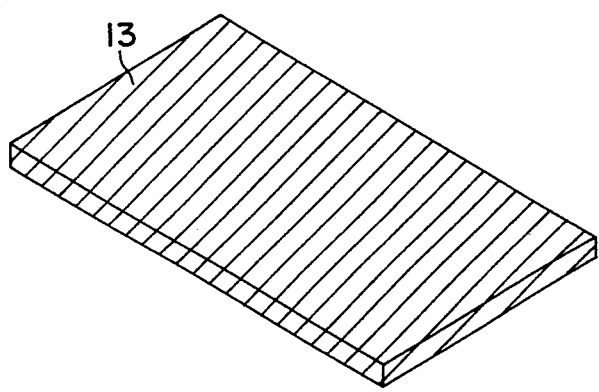
FIGS. 9(a) and 9(b) are a perspective and a cross sectional views of a part of the fabrication method of the angular velocity sensor of the third embodiment.
Figure 9B:
Figure 10A:
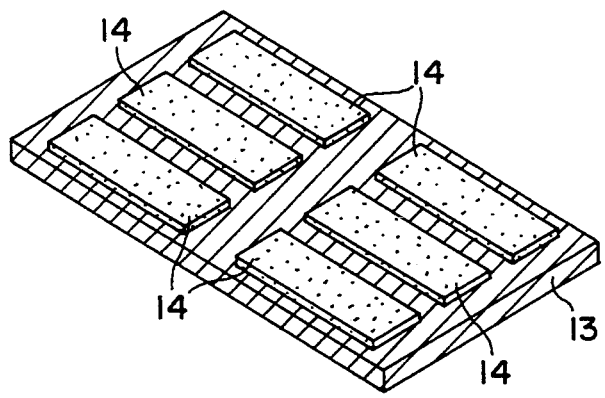
FIGS. 10(a) and 10(b) are a perspective and a cross sectional views of another part of the fabrication method of the angular velocity sensor of the third embodiment.
Figure 10B:
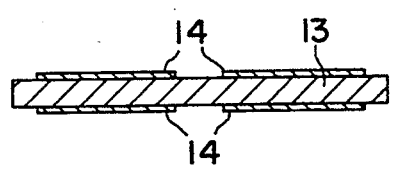

As shown in FIGS. 9(a) and 9(b), provided is the piezoelectric material 13 of a large size sufficient to produce a predetermined number of sized pieces. Then, given pairs of the electrodes 14 made of silver are printed on both sides of the piezoelectric material 13 by fusing print process. as shown in FIGS. 10(a) and 10(b). As the result, the electrodes 14 are arranged in a matrix where they are spaced from each other and each pair on both sides of the piezoelectric material 13 come opposite to each other.

Figure 11A:
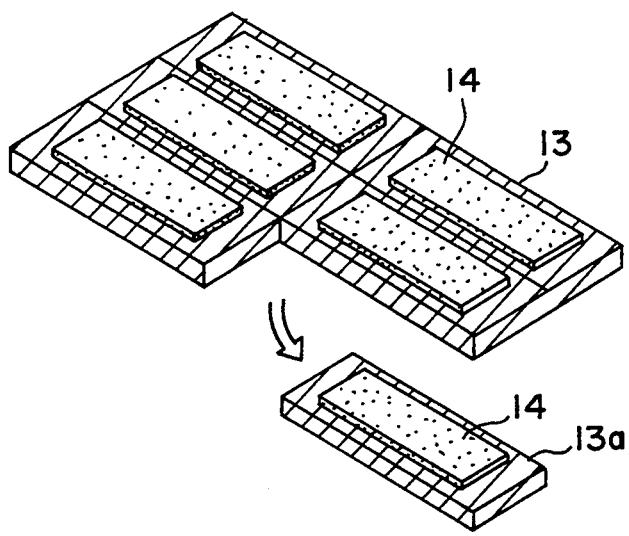
FIGS. 11(a) and 11(b) are a perspective and a cross sectional views of a further part of the fabrication method of the angular velocity sensor of the third embodiment.
Figure 11B:
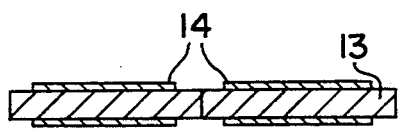
Figure 14:
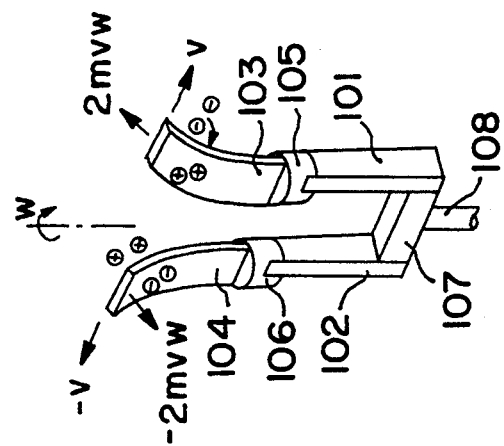
FIG. 14 is a perspective schematic view explaining the detection of an angular velocity with the conventional velocity sensor.
Figure 13:
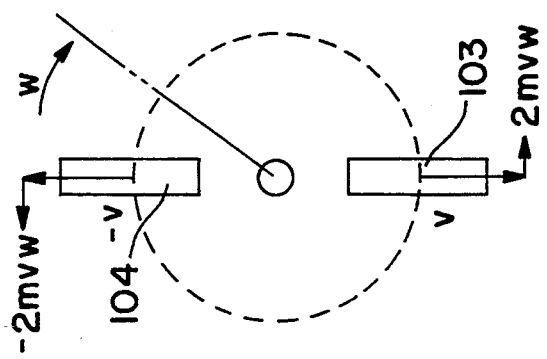
FIG. 13 is an explanatory view showing the principles of detecting an angular velocity with the conventional angular velocity sensor.
Figure 12:
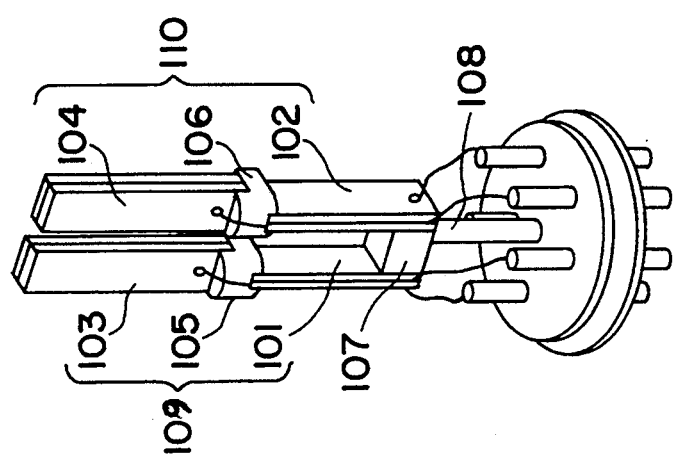
FIG. 12 is a perspective view of a conventional angular velocity sensor.

The piezoelectric material 13 is divided into sizes by cutting between every two adjacent electrodes 14 producing the predetermined number of piezoelectric elements 13a as shown in FIG. 11(a). The piezoelectric elements 13a are bonded to the upper and lower parts of the two eternally elastic metal plates 1 and 5 to constitute the angular velocity sensor of the third embodiment illustrated in FIG. 8. According to the method, the electrodes are arranged separately in a matrix and need not to be cut directly. Hence, the cutting process is facilitated and no burrs nor dust of the metal material of the electrodes are created during the cutting action minimizing electrical faults, e.g. shortcircuit. Also, when the piezoelectric element rather than the eternally elastic metal plate is subjected to the trimming process for balancing the symmetrical vibration assembly, the edge of its piezoelectric substance where the electrodes are not present is ground while producing no metallic dust and undesired electrical faults will be minimized.

Although the electrodes 14 are arranged in a matrix on both sides of the piezoelectric material 13 in the third embodiment, they may be printed in a matrix on one side only.

As set forth above, the angular velocity sensor of the third embodiment of the present invention comprises the first vibrator composed of a first actuator element and a first detector element coupled orthogonally to each other and the second vibrator composed of a second actuator element and a second detector element coupled orthogonally to each other. Also, the two, first and second, vibrators are arranged parallel to each other along the axis of detection to form a tuning-fork structure. The angular velocity sensor can be controlled in the operating characteristics by grinding off a part(s) of the corner edges of each detector element so that two unwanted signals derived from the symmetrical error are offset to zero. In particular, at least one or two electrodes of the detector element are spaced from the corner edge of the-piezoelectric substance. Accordingly, the angular velocity sensor of the third embodiment is specifically improved in the thermal characteristics and will avoid generation of noise caused by external interruption or vibration. Furthermore, the electrodes formed by printing process are not sources of producing burrs and metallic dust thus contributing to the high reliability of the angular velocity sensor which is free from an electrical shortcircuit between the electrodes.

What is claimed is:

1. An angular velocity sensor comprising:
   a first metal plate having a generally rectangular shape, a first lengthwise dimension, and a first metal surface;
   a second metal plate having a generally rectangular shape, a second lengthwise dimension, and a second metal surface;
   one of said first metal plate and said second metal plate having at least one beveled corner edge, said one beveled corner edge having a lengthwise dimension parallel to an axis of detection of the angular velocity sensor and parallel to said first lengthwise dimension and said second lengthwise dimension;
   a first vibrator including a first actuator and a first detector joined orthogonally to each other;
   a second vibrator including a second actuator and a second detector joined orthogonally to each other;
   an electrode block coupling between the first and second vibrators;
   said first and second vibrators arranged parallel to each other along the axis of detection and coupled to each other by said electrode block at the lowermost ends of said actuators forming a tuning-fork structure;
   said first actuator and said first detector including first piezoelectric elements bonded to said first metal surface; and
   said second actuator and said second detector including second piezoelectric elements bonded to said second metal surface.

2. An angular velocity sensor according to claim 1, wherein each of said actuators and said detectors has disposed thereon a piezoelectric substance sandwiched between two electrodes, at least one of the two electrodes being smaller than the piezoelectric substance and fitting within the outer edges of the piezoelectric substance.

3. An angular velocity sensor according to claim 1, wherein each of the first metal plate and the second metal plate includes a bend of 90 degrees formed by bending the first metal plate and the second metal plate along two slits formed in the metal plate extending from different edges of each of the first metal plate and the second metal plate respectively to a center region of each of the metal plates for forming an intersection arrangement, the two slits of each of the first metal plate and the second metal plate beginning at asymmetrical locations at the edges about a lengthwise center line of each of the first metal plate and the second metal plate and extending to almost the lengthwise center line of each of the first metal plate and the second metal plate.

4. An angular velocity sensor according to claim 1, wherein the first metal plate and the second metal plate each include a widthwise dimension which is shorter than the first and second lengthwise dimension.

5. An angular velocity sensor comprising:
a first vibrator including a first actuator piezoelectric element and a first detector piezoelectric element joined orthogonally to each other;
a second vibrator including a second actuator piezoelectric element and a second detector piezoelectric element joined orthogonally to each other;
said first vibrator and said second vibrator formed by bonding said piezoelectric elements to a generally flat rectangular shaped metal plate having a generally rectangular cross-section, a bend of 90 degrees, and a metal plate lengthwise edge, said metal plate having two slits perpendicular to the center of a long axis on a face of said metal plate, each of said slits beginning on one different edge of a face of said metal plate and extending toward an opposite edge a distance approximately one-half of the width of said metal plate, thus forming an upper and an lower part, said upper and lower parts rotated ninety degrees relative to one another until said upper part and said lower part intersect at a right angle to each other to form the bend; and
an electrode block coupling between the first and second vibrators;
at least one metal plate having a beveled corner edge where the first detector piezoelectric element and the second detector piezoelectric element is bonded, said beveled corner edge having a lengthwise dimension parallel to the axis of detection of the angular velocity sensor and parallel to the metal plate lengthwise edge.

6. An angular velocity sensor according to claim 5, wherein each of said actuator and detector elements has disposed thereon a piezoelectric substance sandwiched between two electrodes, at least one of the two electrodes being smaller than the piezoelectric substance and fitting within the outer edges of the piezoelectric substance.

7. An angular velocity sensor according to claim 6, wherein the metal plate of said first vibrator and the metal plate of said second vibrator each include a widthwise dimension which is shorter than the lengthwise dimension.

* * * * *

UNITED STATES PATENT AND TRADEMARK OFFICE
CERTIFICATE OF CORRECTION

| | | |
|---|---|---|
| PATENT NO. | : | 5,445,025 |
| DATED | : | August 29, 1995 |
| INVENTOR(S) | : | Terada et al. |

It is certified that error appears in the above-identified patent and that said Letters Patent is hereby corrected as shown below:

In column 10, line 28, delete "claim 6" and insert therefor --claim 5--.

Signed and Sealed this

Sixteenth Day of April, 1996

*Attest:*

BRUCE LEHMAN

*Attesting Officer*       *Commissioner of Patents and Trademarks*